No. 816,730. PATENTED APR. 3, 1906.
F. M. MURRAY.
SHIELD FOR POTATO DIGGING MACHINES.
APPLICATION FILED NOV. 8, 1905.
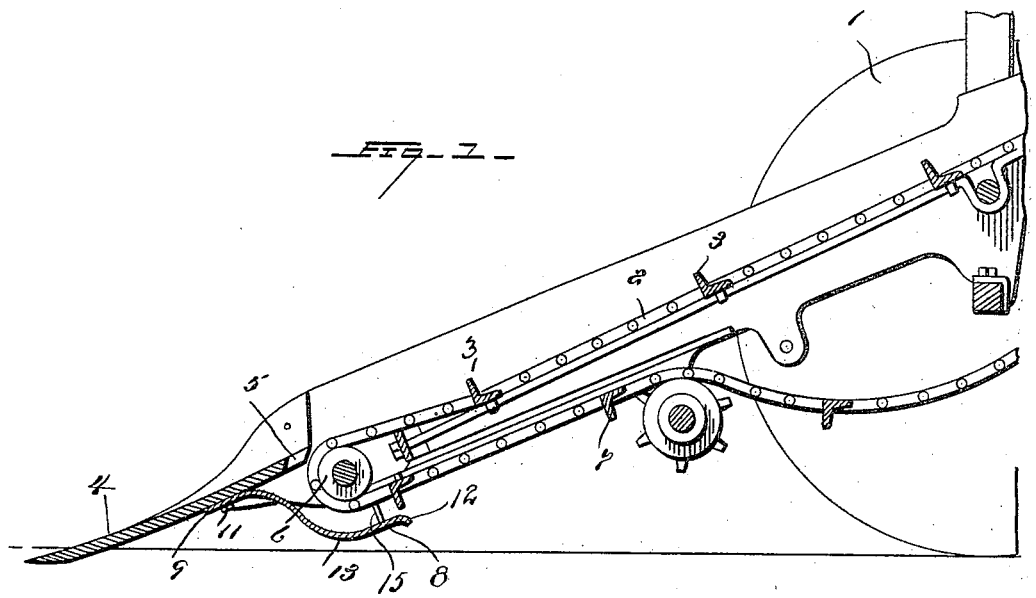
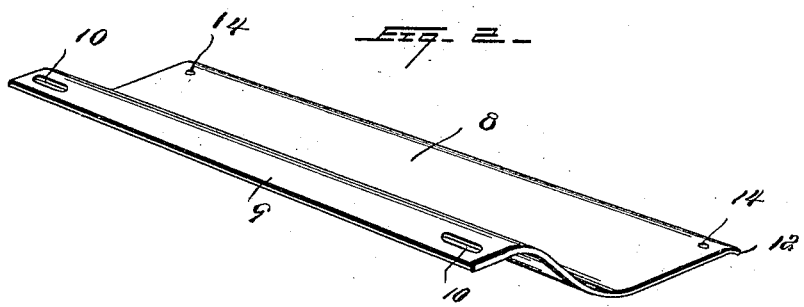
WITNESSES:
INVENTOR
Frank M. Murray
By Watson E. Coleman
Attorney

UNITED STATES PATENT OFFICE.

FRANK M. MURRAY, OF CADYVILLE, NEW YORK.

SHIELD FOR POTATO-DIGGING MACHINES.

No. 816,730.  Specification of Letters Patent.  Patented April 3, 1906.

Application filed November 8, 1905. Serial No. 286,389.

*To all whom it may concern:*

Be it known that I, FRANK M. MURRAY, a citizen of the United States, residing at Cadyville, in the county of Clinton and State of New York, have invented certain new and useful Improvements in Shields for Potato-Digging Machines, of which the following is a specification, reference being had therein to the accompanying drawings.

My invention relates to shields or fenders especially adapted for use on potato diggers and harvesters, one object being to provide a device of the character described whereby the usefulness of such machines on rough, uneven, and stony soil may be greatly enhanced by preventing the clogging of the endless-chain elevator commonly employed for the purpose of conveying the potatoes from the scoop-shovel which digs them from the soil to the screen or separator in the rear of the machine.

A further object of my invention is to provide a simple, practical, durable, and inexpensive shield which can be attached to any potato digger and harvester of the character hereinafter described.

It is a well-known fact that the usefulness of such machines on rough and stony ground is greatly retarded and impaired by reason of the stones, lumps, clods of earth, and the like coming in contact with the elevator or the sprocket-chains by which the same is operated and being thereby dragged or carried into the open space between the rear of the shovel and the elevator and clogging the machine.

Other objects and advantages of my invention, as well as the structural features by means of which these objects are attained, will be made clear by an examination of the specification, taken in connection with the accompanying drawings, in which the same reference-numerals indicate corresponding portions throughout, and in which—

Figure 1 is a longitudinal section taken through the center of a well-known type of potato digger and harvester, and Fig. 2 is a perspective view of my improved shield.

1 designates one of the wheels on which the machine is mounted and which by means of gearing (not shown) and sprocket-chains, one of which is shown in the drawings and designated as 2, sets in motion the elevator 3 as the machine is drawn along over the ground.

4 designates a scoop-shovel, the purpose of which is to dig the potatoes out of the ground, after which they are carried by the elevator 3 onto separator and screen located at the rear of the machine, but not shown. It will be observed that in order to prevent the sprocket-chains or elevator from coming into contact with the rear of the shovel 4 an open space 5 is left between said shovel and the elevator and sprocket-chains. In order for the potatoes to have free and unobstructive passage directly from the shovel and the elevator, it is necessary for the rear of the shovel to be even with or above the elevator as it passes around the roller 6. Consequently that portion of the elevator returning from the rear of the machine and indicated by 7 is necessarily considerably nearer the surface of the ground than the rear of the shovel 4, so that when the point of the shovel is inserted in the soil to a depth necessary to reach the potatoes the elevator is brought to a comparatively short distance from the surface of the ground, and if the soil be at all rough or stony, as is frequently the case in potato-fields on account of that tuber usually requiring gravelly soil in order to procure the best crops, the elevator on its return contacts with stones, lumps of earth, clods, and the like and carries or drags them into the open space 5, thus causing great delay, inconvenience, damage to the machine, and generally impairing its usefulness. To obviate these disadvantages, I have provided the curved shield or fender 8, which conforms to the width of any elevator-frame in use on a digger of the kind shown and which may be made of any suitable material, preferably sheet metal. The end 9 of this shield is flat for a short distance, as shown, to engage the under side of the scoop-shovel 4, where it is removably held in position by means of bolts depending from said shovel and passing through the oblong openings 10 and the nuts 11, screwed on the ends of the bolts. A short distance from the end 9 the shield curves downward until it reaches a point below the elevator, whereupon it is again curved to extend longitudinally with the elevator a distance sufficient to thoroughly protect the elevator and prevent the same from coming in contact with stones, lumps of earth, &c., and at its rear end 12 is curved slightly downward to avoid any danger of the elevator contacting with the rear end thereof. It will be manifest that when the point of the shovel 4 extends into the ground the rounded curved portion 13 of the shield will contact with loose stones, lumps of earth, clods, and the like and shove them aside or pass over them, thus preventing the same from coming in contact with the elevator or sprocket-chains.

14 indicates holes or openings extending through the shield at its rear end, through which, if found necessary, a wire 15 may extend and be connected with the frame of the digger to afford means for supporting the rear end 12 of the shield.

The shield 8, being preferably constructed of sheet-iron plate, is yielding or resilient, so that when obstacles contact with the curved portion 13 it is pressed backward against the tension thereof and immediately returns to its normal position as soon as the obstacle is disengaged. While this may throw the rear end of the shield against the elevator, it will be observed that the upper surface of the fender or shield is perfectly smooth and offers no frictional resistance to the elevator even when pressed against the same.

From the foregoing it is thought that the construction, operation, and many advantages of the herein-described invention will be obvious without further description, and it will be understood that various changes in the form, proportion, and arrangement may be resorted to without departing from the spirit or sacrificing any of the advantages thereof.

Having thus described my said invention, what I claim as new, and desire to secure by Letters Patent of the United States, is—

1. The combination, with a potato digging and harvesting machine, a digging-shovel, and an elevator adapted to convey the potatoes from the shovel to the rear of the machine, of a shield or fender comprising a curved plate having one end removably mounted on the shovel, the contour of the plate following that of the machine toward the rear thereof, and wires depending from the machine and passing through openings in the rear of the plate whereby the same is supported.

2. The combination with a potato-digger having a digging-shovel and an elevator, of a shield or fender comprising a curved, resilient plate having its front end mounted on the shovel, the contour of the plate following that of the machine, and means for supporting the rear end of said plate, said means permitting the resilient plate to yield upwardly, substantially as described.

3. The combination with a potato-digger having a digging-shovel and an elevator, of a shield or fender comprising a transversely-curved, resilient plate having a flat front end formed with elongated openings or slots and a downwardly-curved rear end formed with apertures, bolts or the like passed through said slots for removably securing the front of the plate on said shovel, and connections depending from the machine and engaged with said apertures to support the rear of the resilient plate and permit it to yield upwardly, substantially as described.

In testimony whereof I hereunto affix my signature in presence of two witnesses.

FRANK M. MURRAY.

Witnesses:
  E. TAYLOR,
  D. H. AGNEW.